(12) United States Patent
Tamura

(10) Patent No.: US 10,457,283 B2
(45) Date of Patent: Oct. 29, 2019

(54) VEHICLE DRIVING ASSIST APPARATUS

(71) Applicant: SUBARU CORPORATION, Tokyo (JP)

(72) Inventor: Yuichiroh Tamura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 207 days.

(21) Appl. No.: 15/655,822

(22) Filed: Jul. 20, 2017

(65) Prior Publication Data

US 2018/0065633 A1    Mar. 8, 2018

(30) Foreign Application Priority Data

Sep. 6, 2016    (JP) .................................. 2016-173522

(51) Int. Cl.
*B60W 30/165*    (2012.01)
*G05D 1/02*    (2006.01)

(52) U.S. Cl.
CPC ......... *B60W 30/165* (2013.01); *G05D 1/0212* (2013.01); *G05D 1/0251* (2013.01); *B60W 2550/306* (2013.01); *G05D 2201/0213* (2013.01)

(58) Field of Classification Search
USPC .......................................................... 701/23
See application file for complete search history.

(56) References Cited

U.S. PATENT DOCUMENTS

| 9,227,663 | B2 | 1/2016 | Matsuno | |
|---|---|---|---|---|
| 2003/0072471 | A1* | 4/2003 | Otsuka | G05D 1/0246 382/103 |
| 2004/0172185 | A1* | 9/2004 | Yamamura | B60W 30/16 701/96 |
| 2008/0270018 | A1* | 10/2008 | Citelli | B60K 31/0008 701/532 |
| 2008/0309517 | A1* | 12/2008 | Saito | B60R 1/00 340/937 |
| 2015/0066244 | A1* | 3/2015 | Minemura | B62D 15/0265 701/1 |

(Continued)

FOREIGN PATENT DOCUMENTS

| JP | 2015-013545 A | 1/2015 |
|---|---|---|
| JP | 2015-210720 A | 11/2015 |

*Primary Examiner* — Tyler D Paige
(74) *Attorney, Agent, or Firm* — McDermott Will & Emery LLP

(57) ABSTRACT

A vehicle driving assist apparatus includes a processor that generates a target traveling trajectory of an own vehicle on the basis of a preceding vehicle traveling trajectory. The processor includes: a determining unit that determines first and second fluctuation amounts and compares them with a threshold to determine fluctuation in both end point positions in a widthwise direction of a preceding vehicle; and a first calculator that, on a condition that one of the first and the second fluctuation amounts is greater than the threshold and thereby determined as fluctuating and the other of the first and the second fluctuation amount is equal to or less than the threshold and thereby determined as non-fluctuating, determines a vehicle width center position of the preceding vehicle by setting, as a reference, non-fluctuating one of the both end point positions corresponding to the non-fluctuating one of the first and the second fluctuation amounts.

13 Claims, 10 Drawing Sheets

(56) References Cited

U.S. PATENT DOCUMENTS

| | | | |
|---|---|---|---|
| 2015/0243017 A1* | 8/2015 | Fujimoto | G01S 17/936 |
| | | | 348/142 |
| 2015/0309169 A1* | 10/2015 | Itoh | G01S 7/41 |
| | | | 701/1 |
| 2016/0200321 A1* | 7/2016 | Yamada | B60W 10/06 |
| | | | 701/96 |
| 2016/0288790 A1* | 10/2016 | Aoki | B60W 30/165 |
| 2017/0197549 A1* | 7/2017 | Vladimerou | B60W 50/14 |
| 2017/0197620 A1* | 7/2017 | Igarashi | B60W 30/165 |
| 2017/0267237 A1* | 9/2017 | Oyama | B60W 30/12 |
| 2018/0065633 A1* | 3/2018 | Tamura | B60W 30/165 |
| 2018/0281811 A1* | 10/2018 | Tochioka | B60W 40/09 |

* cited by examiner

VEHICLE DRIVING ASSIST APPARATUS

CROSS-REFERENCE TO RELATED APPLICATIONS

The present application claims priority from Japanese Patent Application No. 2016-173522 filed on Sep. 6, 2016, the entire contents of which are hereby incorporated by reference.

BACKGROUND

The technology relates to a vehicle driving assist apparatus that sets a trajectory of traveling of an own vehicle on the basis of data obtained as a result of sensing a preceding vehicle.

A driving assist apparatus has been known that assists driving of an own vehicle by recognizing lane lines and setting, for example, the middle of a region between the lane lines as a target trajectory of the own vehicle. By setting the target trajectory, the driving assist apparatus allows the own vehicle to travel along the target trajectory. Such a driving assist apparatus recognizes the lane lines that define a traveling lane, such as white lines, on the basis of information on an environment ahead of the own vehicle obtained by means of an outside sensor. Examples of the outside sensor may include a camera and radar both mounted on the own vehicle, and a combination thereof.

The lane lines drawn on a road surface, however, may not often be recognized due to disconnection, fading, or any other factor of the lane lines. The lane lines may not be recognized due to a color, reflection, or any other factor of the road surface as well. To address these, for example, Japanese Unexamined Patent Application Publication (JP-A) No. 2015-210720 discloses a technique that sets, on the basis of lane lines, an "own vehicle traveling trajectory" that serves as a target trajectory of the own vehicle. When a preceding vehicle is recognized, the technique sets a "preceding vehicle traveling trajectory" that serves as the target trajectory of the own vehicle on the basis of a trajectory of traveling of the preceding vehicle.

The technique disclosed in JP-A No. 2015-210720 so performs a driving assist as to allow the own vehicle to travel along the own vehicle traveling trajectory in a case where the lane lines are recognized. However, in a case where the lane lines are not recognizable, the technique so performs the driving assist as to allow the own vehicle to travel along the preceding vehicle traveling trajectory.

SUMMARY

In general, it is desirable that a vehicle driving assist apparatus be able to achieve stable steering performance.

It is desirable to provide a vehicle driving assist apparatus that is able to achieve stable steering performance.

An aspect of the technology provides a vehicle driving assist apparatus that includes a processor. The processor is configured to detect, for each of calculation cycles, both end point positions including a right end point position and a left end point position to set, as a vehicle width center position, a center position between the both end point positions, in which the both end point positions are positions of respective end points located in a vehicle width direction of a preceding vehicle that an own vehicle follows, cause the vehicle width center position set for each of the calculation cycles to be arranged successively to generate a preceding vehicle traveling trajectory, in which the preceding vehicle traveling trajectory is a trajectory of traveling of the preceding vehicle, and generate a target traveling trajectory of the own vehicle on a basis of the preceding vehicle traveling trajectory. The processor includes: a determining unit configured to determine a first fluctuation amount and a second fluctuation amount, and compare the first fluctuation amount and the second fluctuation amount with a threshold to determine a presence of fluctuation in the both end point positions, in which the first fluctuation amount is an amount of fluctuation in the left end point position, and the second fluctuation amount is an amount of fluctuation in the right end point position; and a first calculator configured to, on a condition that one of the first fluctuation amount and the second fluctuation amount is greater than the threshold and thereby determined by the determining unit as fluctuating and the other of the first fluctuation amount and the second fluctuation amount is equal to or less than the threshold and thereby determined by the determining unit as non-fluctuating, determine the vehicle width center position of the preceding vehicle by setting, as a reference, non-fluctuating one of the both end point positions which corresponds to the non-fluctuating one of the first fluctuation amount and the second fluctuation amount.

An aspect of the technology provides a vehicle driving assist apparatus that includes circuitry. The circuitry is configured to detect, for each of calculation cycles, both end point positions including a right end point position and a left end point position to set, as a vehicle width center position, a center position between the both end point positions, in which the both end point positions are positions of respective end points located in a vehicle width direction of a preceding vehicle that an own vehicle follows, cause the vehicle width center position set for each of the calculation cycles to be arranged successively to generate a preceding vehicle traveling trajectory, in which the preceding vehicle traveling trajectory is a trajectory of traveling of the preceding vehicle, generate a target traveling trajectory of the own vehicle on a basis of the preceding vehicle traveling trajectory, determine a first fluctuation amount and a second fluctuation amount, and compare the first fluctuation amount and the second fluctuation amount with a threshold to determine a presence of fluctuation in the both end point positions, in which the first fluctuation amount is an amount of fluctuation in the left end point position, and the second fluctuation amount is an amount of fluctuation in the right end point position, and determine, on a condition that one of the first fluctuation amount and the second fluctuation amount is greater than the threshold and thereby determined as fluctuating and the other of the first fluctuation amount and the second fluctuation amount is equal to or less than the threshold and thereby determined as non-fluctuating, the vehicle width center position of the preceding vehicle by setting, as a reference, non-fluctuating one of the both end point positions which corresponds to the non-fluctuating one of the first fluctuation amount and the second fluctuation amount.

DETAILED DESCRIPTION

In the following, some implementations of the technology are described in detail with reference to the accompanying drawings.

[First Implementation]

Figure 1:
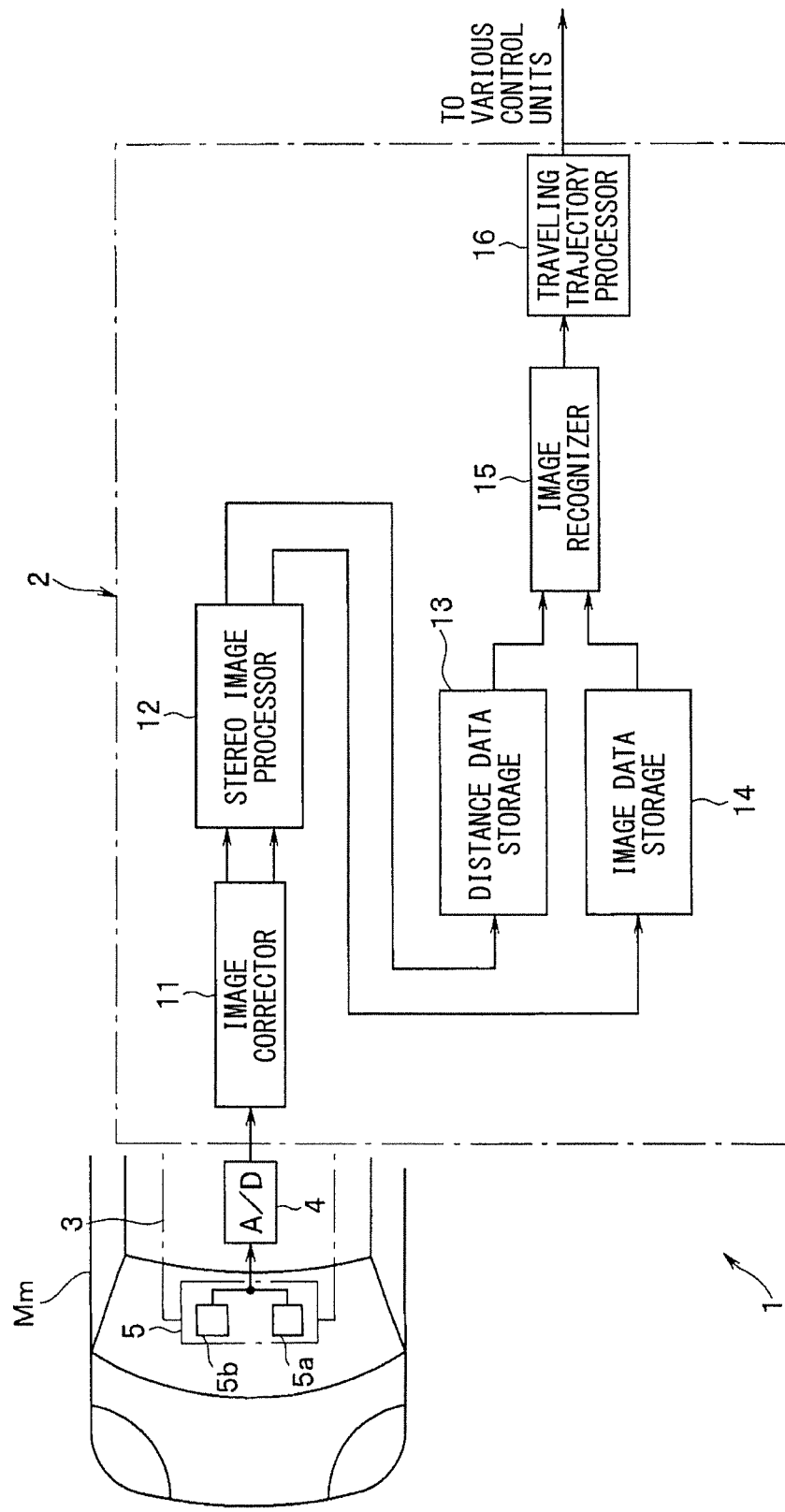
FIG. 1 illustrates an example of functional blocks of a driving assist apparatus according to a first implementation of the technology.

Referring to FIG. 1, a driving assist apparatus 1 according to one implementation of the technology is mounted on a vehicle Mm such as an automobile. The vehicle Mm may also be referred to as an "own vehicle" hereinafter. The driving assist apparatus 1 may include an image processor 2 coupled to a camera unit 3. The image processor 2 may be mainly configured by a computer. The camera unit 3 coupled to an input of the image processor 2 may include an analog/digital (A/D) converter 4 and a vehicle-mounted camera 5 coupled to the image processor 2 through the A/D converter 4. In one implementation, the camera unit 3 may serve as an "outside sensor".

The vehicle-mounted camera 5 may be a stereo camera that includes a main camera 5a and a sub camera 5b. The main camera 5a and the sub camera 5b each may have a built-in image sensor such as a charge-coupled device (CCD) and a complementary metal-oxide semiconductor (CMOS). The main camera 5a and the sub camera 5b as a pair may be provided at their respective predetermined positions, and may perform stereo imaging of an environment outside the own vehicle Mm from different perspectives. For example, the main camera 5a and the sub camera 5b may be so disposed at a front part of a ceiling inside a vehicle interior as to be separated away from each other at equal intervals on right and left sides with the middle in a vehicle width direction in between. In one implementation, the image sensor may serve as an "imaging device".

The main camera 5a may perform imaging that obtains a reference image, e.g., a right image, that is necessary upon performing a stereo image process, and the sub camera 5b disposed on the left side may perform imaging that obtains a comparison image, e.g., a left image. The pieces of analog image data, as a pair of right analog image data and left analog image data thus obtained by the imaging, may be so converted into pieces of digital image data by the A/D converter 4 that the pieces of analog image data are in synchronization with each other. The thus-converted pieces of digital image data may be transmitted to the image processor 2. In one implementation, the pieces of analog image data may serve as "sensing data".

The image processor 2 may include an image corrector 11, a stereo image processor 12, a distance data storage 13, an image data storage 14, an image recognizer 15, and a traveling trajectory processor 16.

The image corrector 11 may perform an image correction process on both of the pieces of image data derived from the camera unit 3, and generate reference image data on the basis of the image data derived from the main camera 5a and comparison image data on the basis of the image data derived from the sub camera 5b. Non-limiting examples of the image correction process may include a geometric conversion of the images and a luminance correction.

The stereo image processor 12 may determine, on the basis of the reference image data and the comparison image data both having been subjected to the image correction process performed by the image corrector 11, a distance to an object, i.e., determine data on the distance to the object (referred to as "distance data"), for the captured images corresponding to one frame. The stereo image processor 12 may use a parallax with respect to an identical object and principle of triangulation to thereby determine the distance data. The stereo image processor 12 may respectively store the distance data on the distance to the object and the pieces of image data corresponding to the relevant distance data into the distance data storage 13 and the image data storage 14.

The image recognizer 15 may recognize an object with use of the image data stored in the image data storage 14, and may recognize a three-dimensional position of the corresponding object on the basis of the distance data stored in the distance data storage 13.

The traveling trajectory processor 16 may recognize, on the basis of information on the three-dimensional position of the object recognized by the image recognizer 15, lane lines that define both sides of a lane along which the own vehicle Mm travels. Non-limiting examples of the lane lines may include white lines and other colored lines. By recognizing the lane lines, the traveling trajectory processor 16 may generate, in the middle of the lane lines, a traveling trajectory along which the own vehicle Mm is to travel. In other words, the traveling trajectory processor 16 generates an own vehicle traveling trajectory. At the same time, the traveling trajectory processor 16 may recognize a preceding vehicle Mf as a target that the own vehicle Mm follows, and may generate a traveling trajectory of the preceding vehicle Mf on the basis of information on a position of the recognized preceding vehicle Mf. In other words, the traveling trajectory processor 16 generates a preceding vehicle traveling trajectory. In many cases, the preceding vehicle that the own vehicle Mm follows is, for example but not limited to, a preceding vehicle that travels immediately in front of the own vehicle Mm. When the generation of the own vehicle traveling trajectory is successful, the traveling trajectory processor 16 may output the generated own vehicle traveling trajectory as a target traveling trajectory. When the lane lines are unrecognized and thus the generation of the own vehicle traveling trajectory is unsuccessful, the traveling trajectory processor 16 may output the preceding vehicle traveling trajectory as the target traveling trajectory.

The target traveling trajectory, i.e., information on the target traveling trajectory, may indicate a traveling course along which the own vehicle Mm is to travel, and may be outputted to each control unit that controls traveling of the own vehicle Mm, including a steering controller. For example, the steering controller may so perform a steering control as to allow the own vehicle Mm to travel along the target traveling trajectory.

The traveling trajectory processor 16 may first detect, for each image data corresponding to a predetermined frame, right and left end points Xr and Xl of the recognized preceding vehicle Mf as viewed from the rear of the recognized preceding vehicle Mf. The predetermined frame may be one frame, for example. It is to be noted that the right and the left end points Xr and Xl represent respective positions, i.e., right and left end point positions, of a horizontal coordinate within the frame. The horizontal coordinate is, in other words, an x-axis coordinate. According to the present implementation, the traveling trajectory processor 16 may set, without limitation, a left end of the frame as a reference of the horizontal coordinate, i.e., the x-axis coordinate.

Further, on the basis of a distance between the right and the left end points Xr and Xl, the traveling trajectory processor 16 may determine a vehicle width W of the preceding vehicle Mf and preceding vehicle center Xf that represents, in coordinates, a position of the center between the right and the left end points Xr and Xl. In other words, the vehicle width W of the preceding vehicle Mf is a preceding vehicle width W, and the position of the center between the right and the left end points Xr and Xl is a vehicle width center position. The traveling trajectory processor 16 may thereafter sequentially store coordinate data of each of the right end point Xr, the left end point Xl, the preceding vehicle width W, and the preceding vehicle center Xf into a storage for each frame. For example, the storage may be a random access memory (RAM). In addition, the traveling trajectory processor 16 may sequentially compare the preceding vehicle width W of the preceding vehicle Mf with a maximum value of the past preceding vehicle width W (i.e., a past preceding vehicle width maximum value W_max) of the corresponding preceding vehicle Mf stored in the storage such as RAM. When a result of the comparison indicates that the preceding vehicle width W is greater than the preceding vehicle width maximum value W_max (W>W_max), the traveling trajectory processor 16 may update the preceding vehicle width maximum value W_max with the current preceding vehicle width W. Thereafter, the traveling trajectory processor 16 causes the preceding vehicle centers Xf sequentially stored in the storage to be arranged successively to thereby generate the preceding vehicle traveling trajectory.

Figure 4:
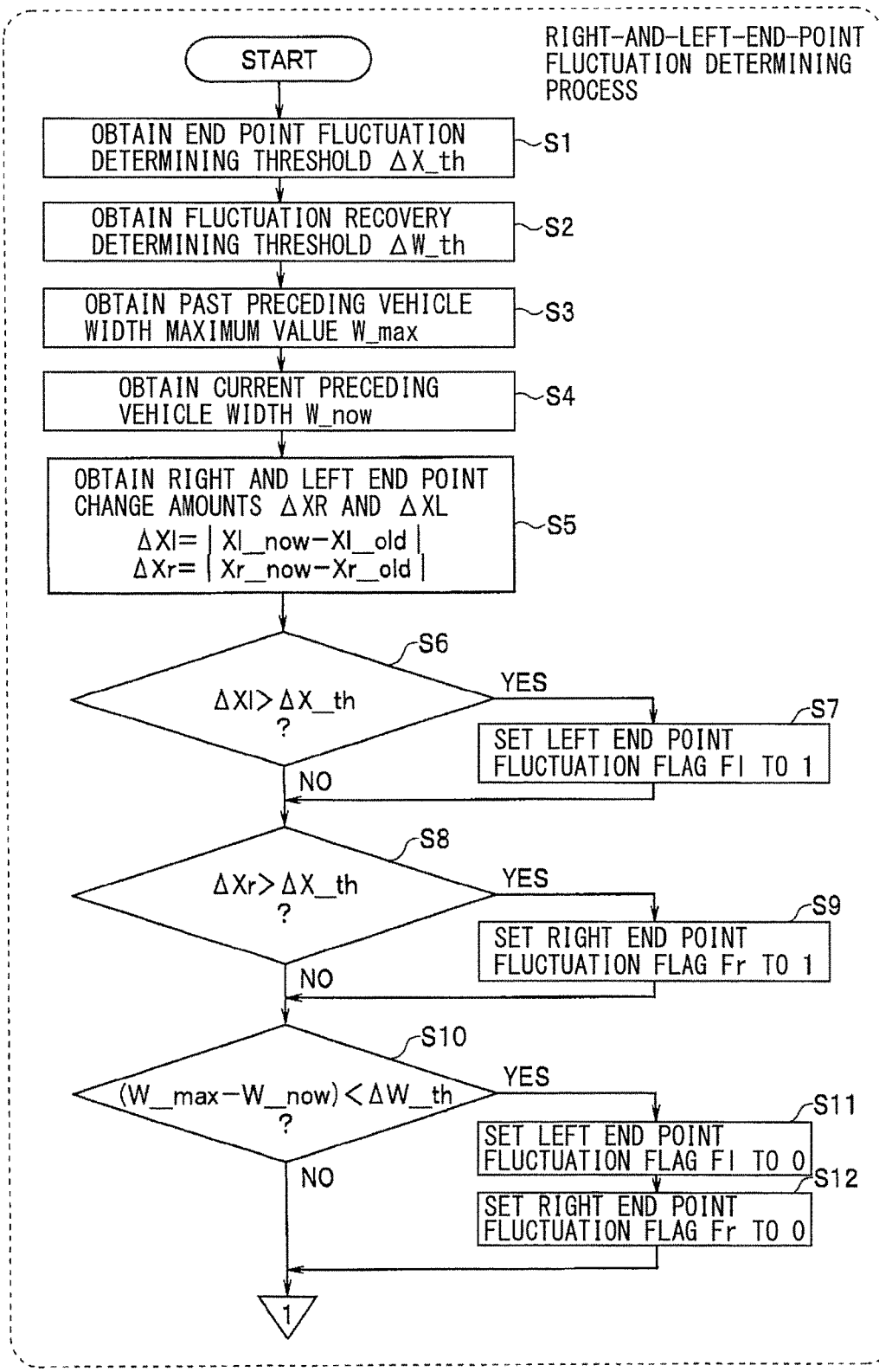
FIG. 4 is a first flowchart of an example routine directed to a calculation of preceding vehicle center according to the first implementation of the technology.
Figure 5:
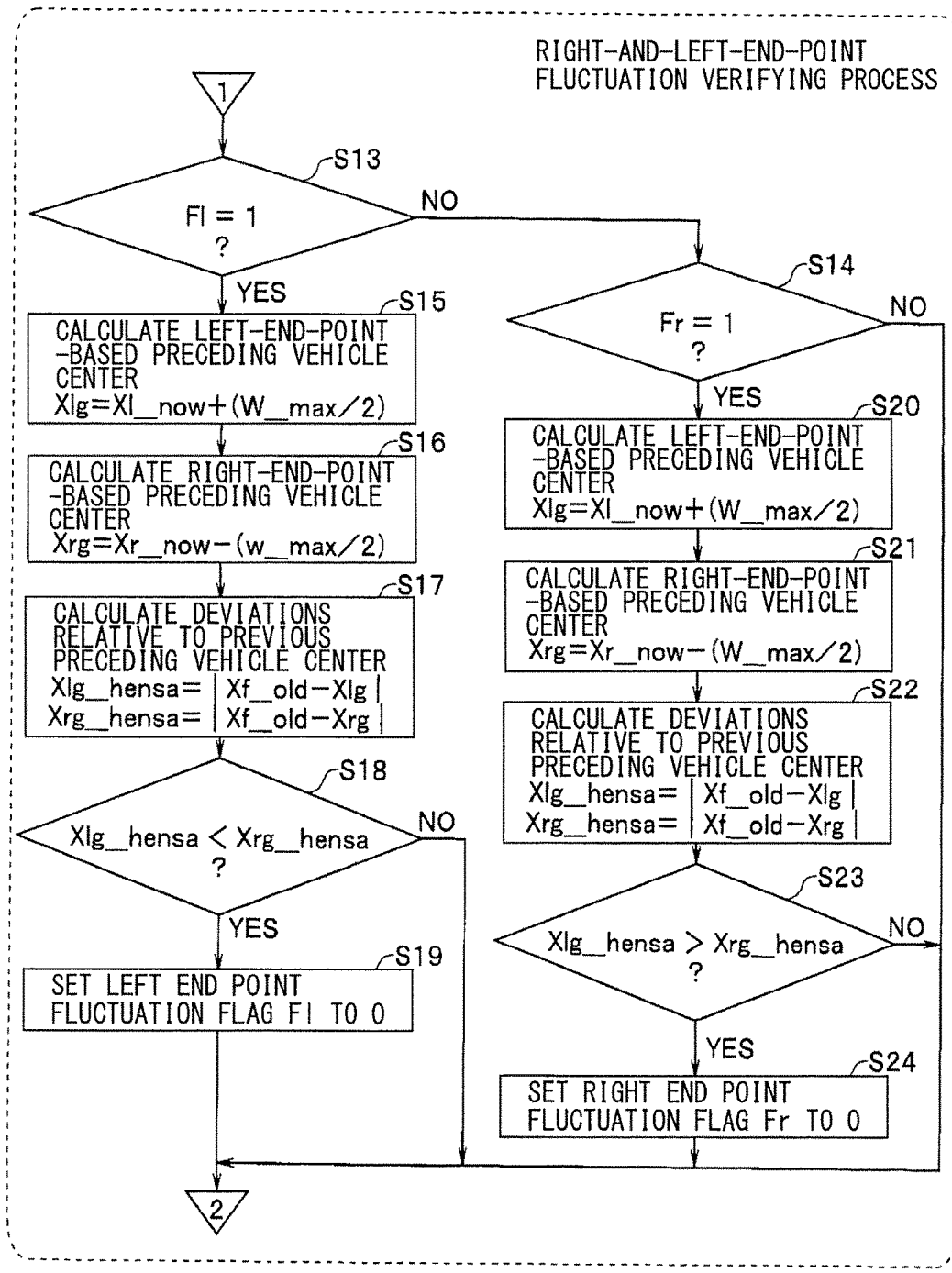
FIG. 5 is a second flowchart of the example routine directed to the calculation of the preceding vehicle center according to the first implementation of the technology.
Figure 6:
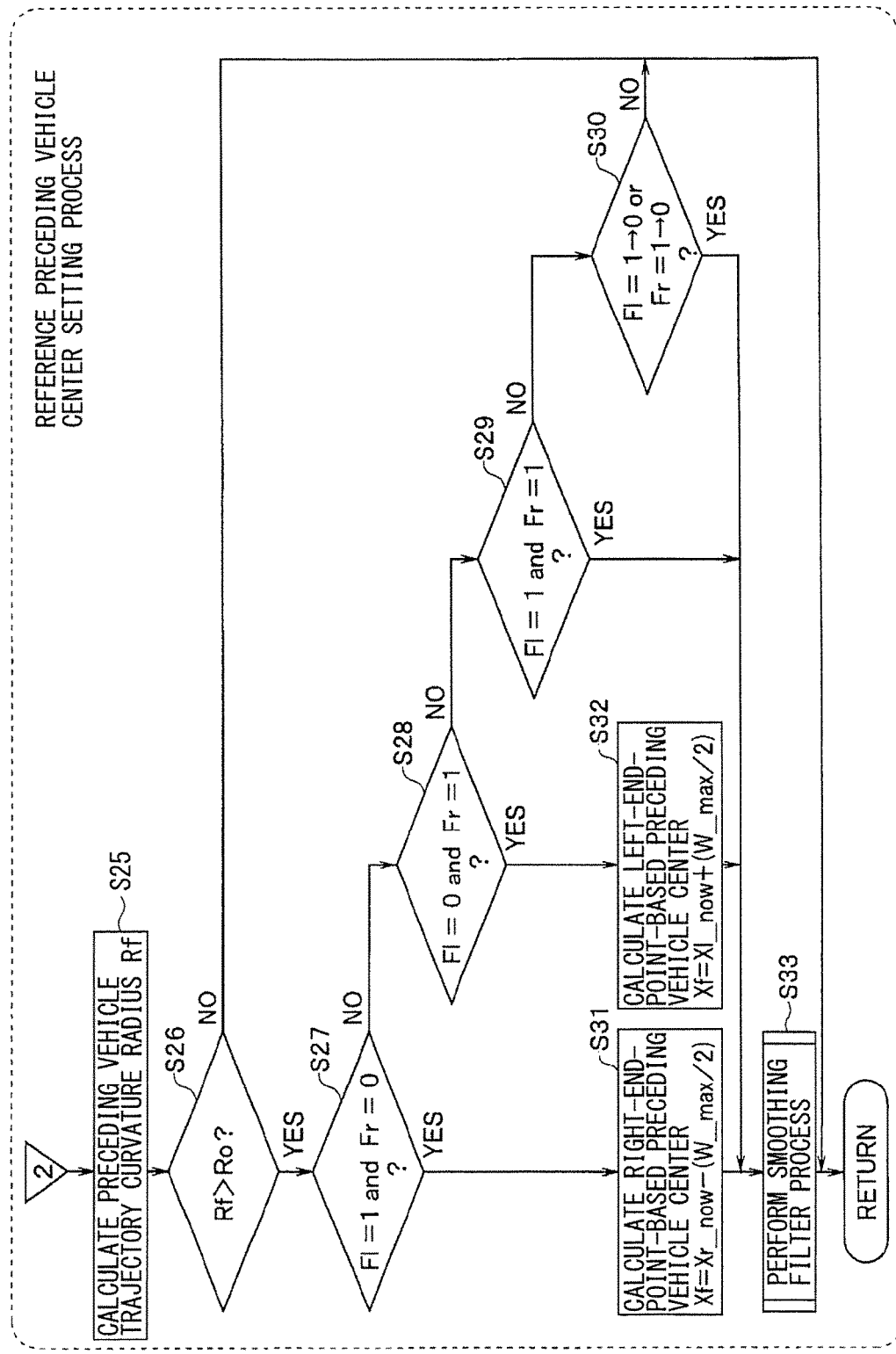
FIG. 6 is a third flowchart of the example routine directed to the calculation of the preceding vehicle center according to the first implementation of the technology.

The preceding vehicle center Xf read out upon generating the preceding vehicle traveling trajectory may be obtained in accordance with a routine directed to a calculation of the preceding vehicle center Xf illustrated by way of example in FIGS. 4 to 6. Note that one method of generating the own vehicle traveling trajectory on the basis of the recognized lane lines is disclosed in JP-A No. 2015-13545 filed with the JPO by the present Applicant (which is also disclosed in the Applicant's U.S. Pat. No. 9,227,663 filed with the USPTO on Jun. 17, 2014; the entire contents of which are incorporated herein by reference) and will therefore not be described in detail.

The routine may start up when the right and the left end points Xr and Xl of the preceding vehicle Mf traveling immediately in front of the own vehicle Mm is detected. An error may be issued when both of the right and the left end points Xr and Xl are undetected.

Figure 2:
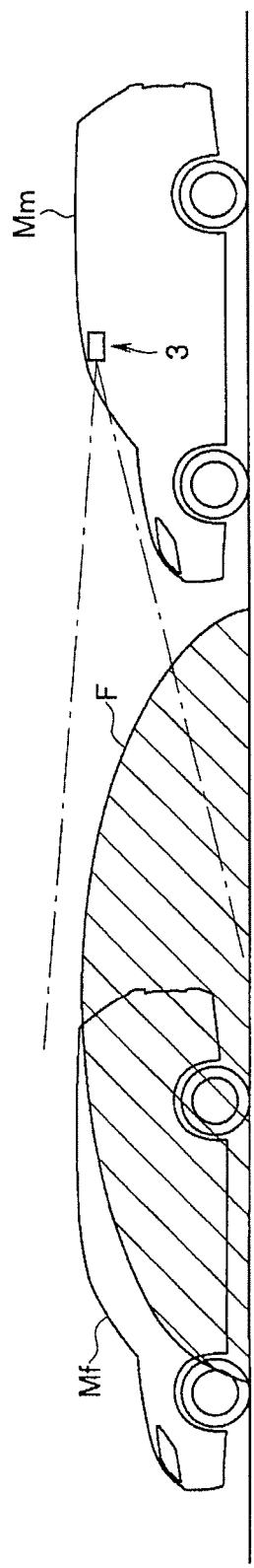
FIG. 2 describes a state in which an own vehicle so travels as to follow a preceding vehicle.

First, a process of determining a fluctuation of the right and the left end points Xr and Xl, or an "right-and-left-end-point fluctuation determining process", may be performed from steps S1 to S12. As used herein, the term "fluctuation determination" and its variants refer to a determination as to whether there is a variation in the pieces of data on the detected right and left end points Xr and Xl. More specifically, the preceding vehicle width W, calculated on the basis of the region between the right and the left end points Xr and Xl of the preceding vehicle Mf detected for each frame, takes the same value within a predetermined error range when the own vehicle Mm so travels as to follow the same preceding vehicle Mf. However, a factor F that interrupts the recognition of the preceding vehicle Mf, i.e., a visibility inhibiting factor F, may possibly be present between the own vehicle Mm and the preceding vehicle Mf as illustrated in FIG. 2 when the own vehicle Mm travels under bad weather such as rainfall, snowfall, and fog, or when the own vehicle Mm travels under an adverse condition such as a splash of water and a splay of snow both flown by the preceding vehicle Mf. Such a visibility inhibiting factor F may possibly cause low visibility and thereby make the recognition of the preceding vehicle Mf by means of the images captured by the camera unit 3 difficult, making it difficult to recognize the right and the left end points Xr and Xl accurately in some cases.

Figure 3A:
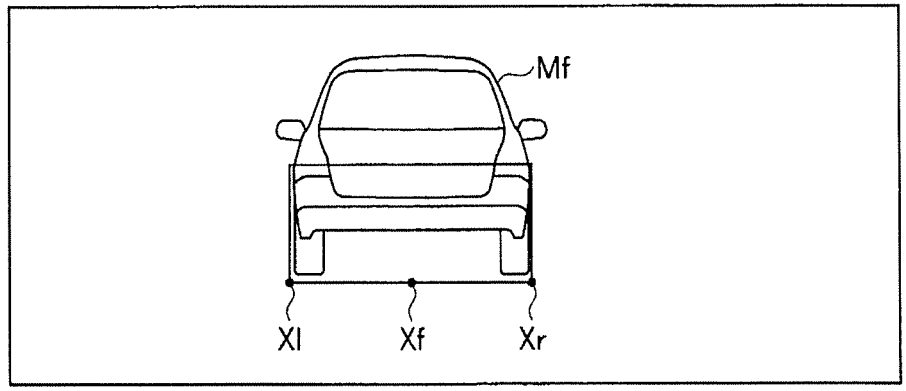
FIG. 3A describes a state in which right and left end points are accurately estimated on the basis of an image of the preceding vehicle according to a comparative example.
Figure 3B:
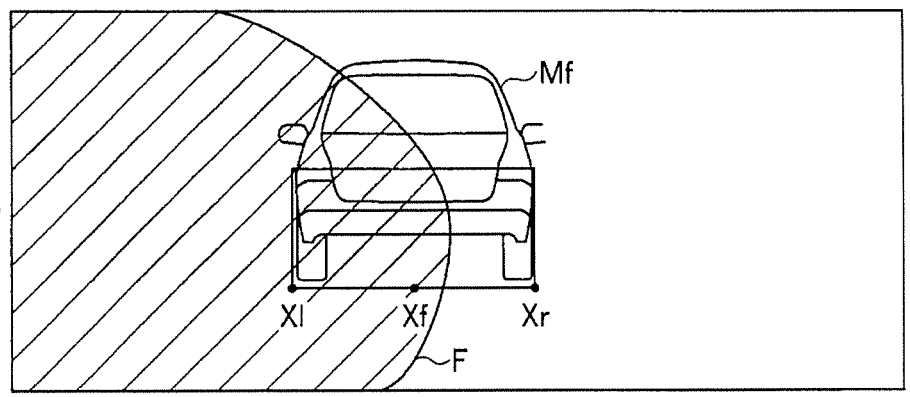
FIG. 3B describes a state in which the right and the left end points are estimated under an adverse condition according to the comparative example.

Referring to FIG. 3B according to a comparative example, the detection of the accurate right and left end points Xr and Xl is possible on the basis of the image data obtained from the camera unit 3 when it is possible to recognize, on the basis of that image data, the preceding vehicle Mf through the visibility inhibiting factor F. However, referring to FIG. 3C, one of the end points (the left end point Xl in FIG. 3C) may possibly be recognized erroneously when the image data lacks part of the preceding vehicle Mf due to the visibility inhibiting factor F, causing preceding vehicle center Xf calculated on the basis of such right and left end points Xr and Xl to take an erroneous value by which the preceding vehicle center Xf is deviated from the actual preceding vehicle center Xf illustrated by white circles in FIG. 8 toward one side as illustrated by black circles in FIG. 8.

To address such a concern, the present implementation makes it possible to determine the preceding vehicle center Xf accurately even when a defect is present at part of the preceding vehicle Mf recognized on the basis of the image data.

First, a threshold $\Delta X\_th$ directed to a determination on the fluctuation of the right and the left end points Xr and Xl, i.e., an "end point fluctuation determining threshold $\Delta X\_th$", may be obtained in step S1. The end point fluctuation determining threshold $\Delta X\_th$ may be a reference value directed to a determination as to whether the right and the left end points Xr and Xl are proper right and left end points of the preceding vehicle Mf, and may be a fixed value stored in advance in a storage such as a read-only memory (ROM).

Thereafter, a threshold $\Delta W\_th$ directed to a determination on recovery of the fluctuation of the preceding vehicle width, i.e., a "fluctuation recovery determining threshold $\Delta W\_th$", may be obtained in step S2. The fluctuation recovery determining threshold $\Delta W\_th$ may be a reference value directed to an examination as to whether the detected preceding vehicle width W fluctuates, and may be a fixed value stored in advance in the storage such as the ROM. In other words, the fluctuation recovery determining threshold ΔW_th may be a reference value directed to an examination as to whether the detected preceding vehicle width W is high in reliability, and may be read out in later-described step S10.

Thereafter, the flow may proceed to step S3 in which the preceding vehicle width maximum value W_max of the relevant preceding vehicle Mf is obtained. The preceding vehicle width maximum value W_max may be the maximum value of the width, i.e., the preceding vehicle width W, between the right and the left end points Xr and Xl detected for each frame, and may be updated sequentially and stored in the storage such as the RAM. In one implementation, the traveling trajectory processor 16 that performs the process in step S3 may serve as a "preceding vehicle width maximum value obtaining unit" or an "obtaining unit".

Thereafter, the flow may proceed to step S4 in which a preceding vehicle width W_now is obtained. The preceding vehicle width W_now may be determined on the basis of a current frame. Thereafter, the flow may proceed to step S5 in which an amount of change in each of the right and left end points Xr and Xl, i.e., "right and left end point change amounts ΔXr and ΔXl" are obtained. The right end point change amount ΔXr may be obtained on the basis of an absolute value of a difference between a currently-obtained right end point Xr_now and a right end point Xr_old (i.e., ΔXr=|Xr_now—Xr_old|). The left end point change amount ΔXl may be obtained on the basis of an absolute value of a difference between a currently-obtained left end point Xl_now and a left end point Xl_old (i.e., ΔXl=|Xl_now−Xl_old|). The right and the left end points Xr_old and Xl_old each may be obtained on the basis of a frame belonging to a previous calculation cycle.

Thereafter, the flow may proceed to step S6 in which the left end point change amount ΔXl is compared with the end point fluctuation determining threshold ΔX_th obtained in the foregoing step S1 to examine whether the currently-detected left end point Xl fluctuates. In other words, a determination may be made in step S6 as to whether the current left end point Xl is high in reliability. When a determination is made that the left end point change amount ΔXl is greater than the end point fluctuation determining threshold ΔX_th (ΔXl>ΔX_th), the flow may diverge from step S6 to step S7 by determining that the left end point Xl fluctuates, i.e., is low in reliability. In step S7, a left end point fluctuation flag Fl may be set (Fl: 1), following which the flow may proceed to step S8. Note that an initial value of the left end point fluctuation flag Fl may be 0 (zero). In contrast, when a determination is made in step S6 that the left end point change amount ΔXl is equal to or less than the end point fluctuation determining threshold ΔX_th (ΔXl≤ΔX_th), the flow may proceed to step S8 by determining that the left end point Xl is proper or does not fluctuate, i.e., is high in reliability.

When the flow proceeds from step S6 or S7 to step S8, the right end point change amount ΔXr may be compared with the end point fluctuation determining threshold ΔX_th to examine whether the currently-detected right end point Xr fluctuates. In other words, a determination may be made in step S8 as to whether the current right end point Xr is high in reliability. When a determination is made that the right end point change amount ΔXr is greater than the end point fluctuation determining threshold ΔX_th (ΔXr>ΔX_th), the flow may diverge from step S8 to step S9 by determining that the right end point Xr fluctuates, i.e., is low in reliability. In step S9, a right end point fluctuation flag Fr may be set (Fr: 1), following which the flow may proceed to step S10. Note that an initial value of the right end point fluctuation flag Fr may be 0 (zero). In contrast, when a determination is made in step S8 that the right end point change amount ΔXr is equal to or less than the end point fluctuation determining threshold ΔX_th (ΔXr≤ΔX_th), the flow may proceed to step S10 by determining that the right end point Xr is proper or does not fluctuate, i.e., is high in reliability.

In step S10, a determination may be made as to whether a difference between the preceding vehicle width maximum value W_max obtained in the foregoing step S3 and the preceding vehicle width W_now obtained in the foregoing step S4 ΔW_max−W_now) is less than the fluctuation recovery determining threshold ΔW_th obtained in the foregoing step S2. In other words, a determination may be made in step S10 as to whether the end point fluctuation is recovered, i.e., whether the reliability is recovered.

When a determination is made in step S10 that the difference is less than the fluctuation recovery determining threshold ΔW_th ((W_max−W_now)<ΔW_th), the flow may diverge from step S10 to step S11 by determining that the end point fluctuation is recovered. In step S11 and its subsequent step S12, the left end point fluctuation flag Fl and the right end point fluctuation flag Fr may be cleared (Fl: 0 and Fr: 0), following which the flow may proceed to step S13. In contrast, when a determination is made in step S10 that the difference is equal to or greater than the fluctuation recovery determining threshold ΔW_th ((W_max−W_now)≥ΔW_th), the flow may proceed straight to step S13 by determining that the end point fluctuation is not recovered. In one implementation, the traveling trajectory processor 16 that performs the processes from steps S5 to S12 may serve as an "end point fluctuation determining unit" or a "determining unit".

When the flow proceeds from step S10 or S12 to step S13, a process of verifying the fluctuation of the right and the left end points Xr and Xl, or an "right-and-left-end-point fluctuation verifying process", may be performed from steps S13 to S24. In one implementation, the traveling trajectory processor 16 that performs the processes from steps S13 to S24 may serve as an "end-point fluctuation verifying unit" or a "verifying unit". In a case, however, where a state continues in which the value of one of the left end point fluctuation flag Fl and the right end point fluctuation flag Fr is set continuously in a plurality of calculation cycles upon proceeding from step S12 to step S13, the obtained pieces of data may be cancelled until both of the left end point fluctuation flag Fl and the right end point fluctuation flag Fr are cleared. In other words, upon proceeding from step S12 to step S13, any obtained data may be cancelled until the fluctuation of the right end point Xr and the fluctuation of the left end point Xl both improve in a case where there is no improvement in the fluctuation of one of the measured right and left end points Xr and Xl.

First, the value of the left end point fluctuation flag Fl may be checked in step S13. The flow may proceed to step S15 when the value of the left end point fluctuation flag Fl is one (Fl=1) by determining that the left end point Xl fluctuates. In contrast, when the value of the left end point fluctuation flag Fl is zero (Fl=0), the flow may diverge from step S13 to step S14 in which the value of the right end point fluctuation flag Fr may be checked. The flow may proceed to step S20 when the value of the right end point fluctuation flag Fr is one (Fr=1) by determining that the right end point Xr fluctuates. In contrast, when the value of the right end point fluctuation flag Fr is zero (Fr=0), the flow may jump to step S25 by determining that the right and the left end points Xr and Xl do not fluctuate, i.e., are high in reliability.

When the flow proceeds from step S13 to step S15, a process of verifying the fluctuation of the left end point Xl, or a "left end point fluctuation verifying process", may be performed from steps S15 to S19. In contrast, a process of verifying the fluctuation of the right end point Xr, or a "right end point fluctuation verifying process", may be performed from steps S20 to S24 when the flow proceeds from step S14 to step S20.

Figure 7:
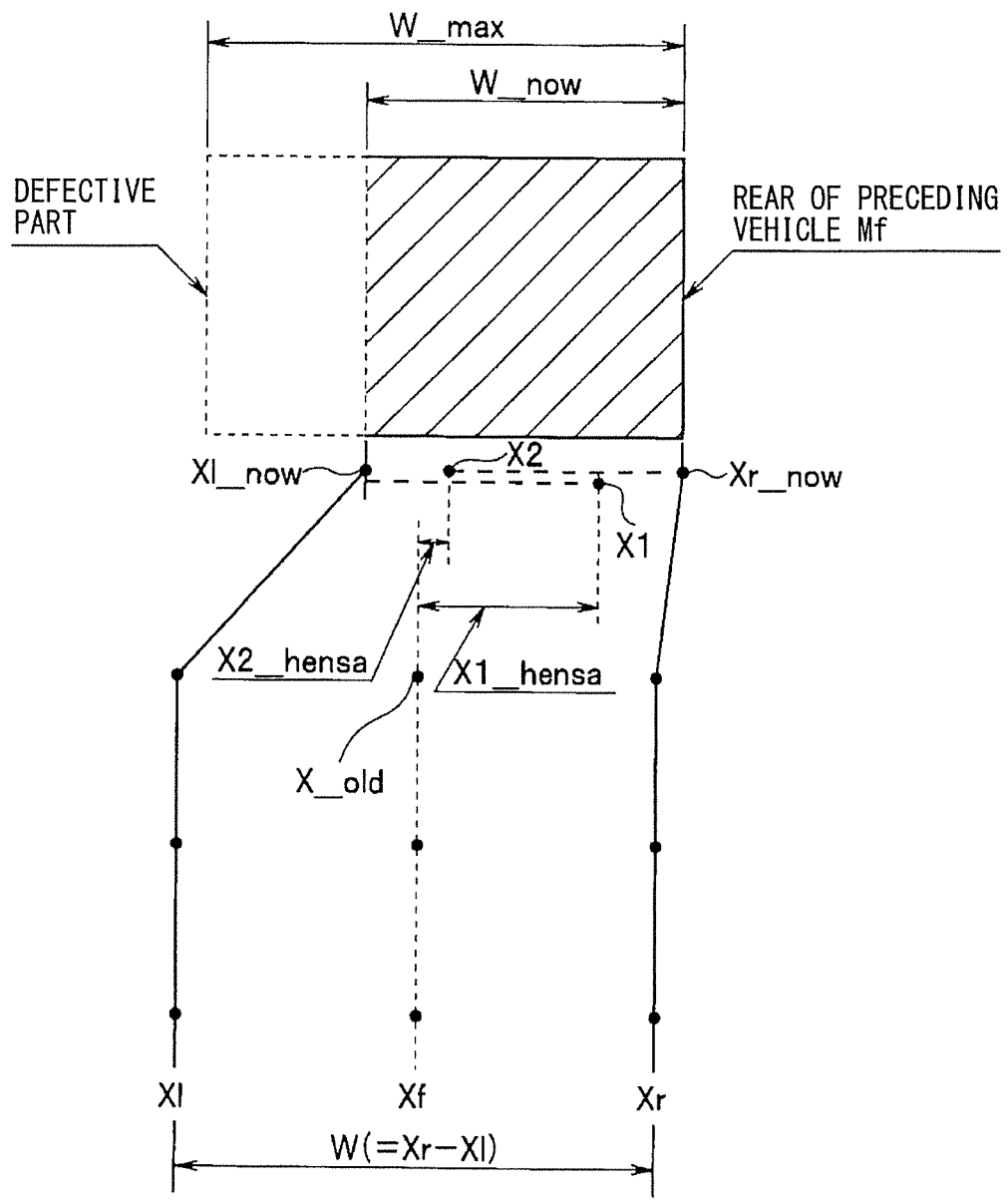
FIG. 7 describes one method of determining the preceding vehicle center according to the first implementation of the technology.

A description is given first on the left end point fluctuation verifying process. Referring to FIG. 7, preceding vehicle center Xlg (based on the X-axis coordinate) may be calculated in step S15 from the following expression (1).

$$Xlg = Xl\_now + (W\_max/2) \quad (1)$$

In the present implementation, a left end of a frame may be set as a reference of the horizontal coordinate, i.e., the x-axis coordinate. The preceding vehicle center Xlg may be based on the left end point Xl of the preceding vehicle Mf as a reference.

Thereafter, as illustrated in FIG. 7, the flow may proceed to step S16 in which preceding vehicle center Xrg may be calculated from the following expression (2).

$$Xrg = Xr\_now - (W\_max/2) \quad (2)$$

The preceding vehicle center Xrg may be based on the right end point Xr as a reference.

In step S17, as illustrated in FIG. 7, deviation of the currently-determined preceding vehicle center Xlg to preceding vehicle center Xf_old (i.e., preceding vehicle center deviation Xlg_hensa) and deviation of the currently-determined preceding vehicle center Xrg to the preceding vehicle center Xf_old (i.e., preceding vehicle center deviation Xrg_hensa) may be thereafter calculated from the following expressions (3) and (4).

$$Xlg\_hensa = |Xf\_old - Xlg| \quad (3)$$

$$Xrg\_hensa = |Xf\_old - Xrg| \quad (4)$$

The preceding vehicle center Xf_old may belong to the preceding vehicle center determined in a previous calculation cycle, and may be stored in the storage.

Figure 8:
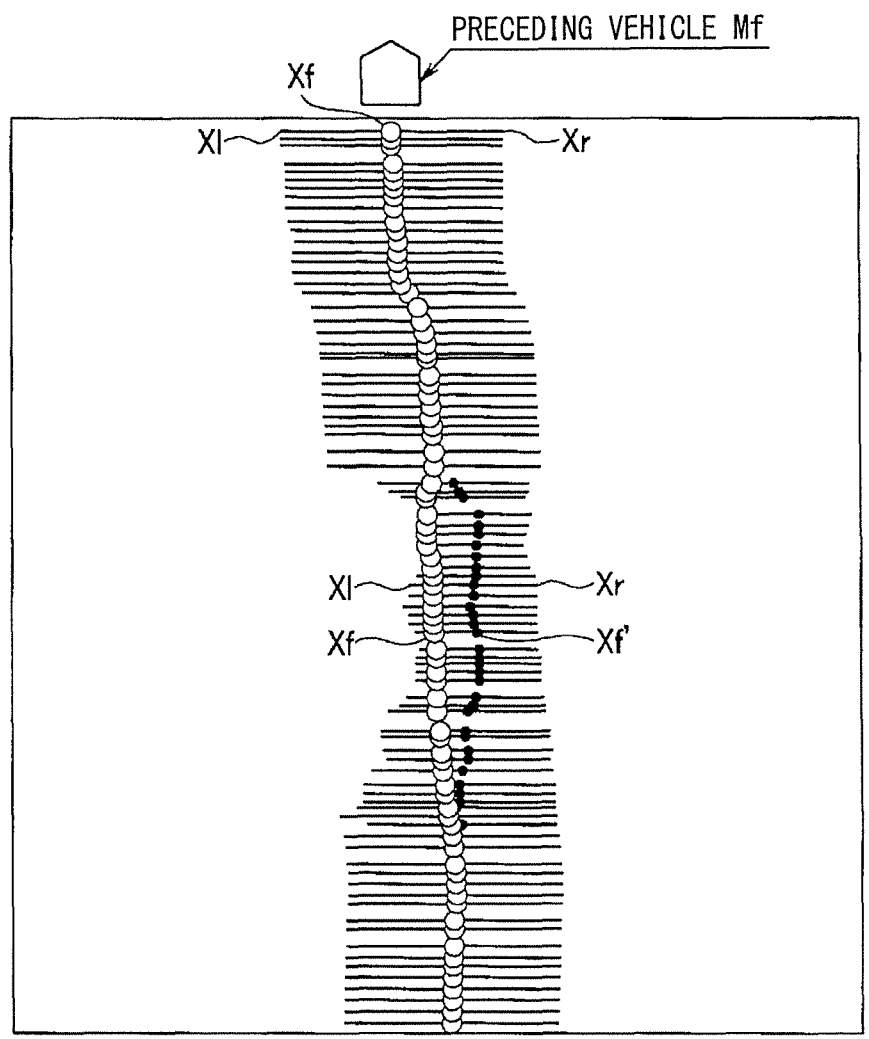
FIG. 8 describes an example of a preceding vehicle traveling trajectory according to the first implementation of the technology.

Thereafter, the flow may proceed to step S18 in which the preceding vehicle center deviation Xlg_hensa based on the left end point Xl and the preceding vehicle center deviation Xrg_hensa based on the right end point Xr are compared with each other. When the preceding vehicle center deviation Xlg_hensa based on the left end point Xl is smaller than the preceding vehicle center deviation Xrg_hensa based on the right end point Xr (i.e., Xlg_hensa<Xrg_hensa), the flow may proceed to step S19 by determining that the fluctuation of the left end point Xl is subtle. In step S19, the left end point fluctuation flag Fl set in the foregoing step S7 may be cleared (Fl: 0), following which the flow may proceed to step S25. In contrast, the flow may jump straight to step S25 by determining that the left end point Xl fluctuates, when the preceding vehicle center deviation Xlg_hensa based on the left end point Xl is equal to or greater than the preceding vehicle center deviation Xrg_hensa based on the right end point Xr (i.e., Xlg_hensa≥Xrg_hensa) in step S18. Note that FIG. 8 illustrates an example of a state in which the fluctuation is present in the left end point Xl.

A description is given next on the right end point fluctuation verifying process. When the flow proceeds from step S14 to step S20, the preceding vehicle center Xlg and the preceding vehicle center Xrg may be respectively calculated and estimated in steps S20 and S21 by performing their respective processes similar to those of the foregoing steps S15 and S16. Thereafter, in step S22, the preceding vehicle center deviation Xlg_hensa based on the left end point Xl and the preceding vehicle center deviation Xrg_hensa based on the right end point Xr may be determined in a manner similar to that of step S17.

Thereafter, in step S23, the preceding vehicle center deviation Xlg_hensa based on the left end point Xl and the preceding vehicle center deviation Xrg_hensa based on the right end point Xr may be compared with each other. When the preceding vehicle center deviation Xrg_hensa based on the right end point Xr is smaller than the preceding vehicle center deviation Xlg_hensa based on the left end point Xl (i.e., Xlg_hensa>Xrg_hensa), the flow may proceed to step S24 by determining that the fluctuation of the right end point Xr is subtle. In step S24, the right end point fluctuation flag Fr set in the foregoing step S9 may be cleared (Fr: 0), following which the flow may proceed to step S25. In contrast, the flow may jump straight to step S25 by determining that the right end point Xr fluctuates, when the preceding vehicle center deviation Xrg_hensa based on the right end point Xr is equal to or greater than the preceding vehicle center deviation Xlg_hensa based on the left end point Xl (i.e., Xlg_hensa≤Xrg_hensa) in step S23.

When the flow proceeds to step S25, a process of setting reference preceding vehicle center of the right and the left end points Xr and Xl, or a "reference preceding vehicle center setting process", may be performed from steps S25 to S32. First, in step S25, a curvature radius of a trajectory of the preceding vehicle Mf, or a "preceding vehicle trajectory curvature radius Rf", may be determined from the traveling trajectory of the preceding vehicle Mf that the own vehicle Mm follows. For example, the preceding vehicle trajectory curvature radius Rf may be calculated using a known curve approximation method and on the basis of the preceding vehicle traveling trajectory formed as a result of causing the preceding vehicle center Xf to be arranged successively.

Thereafter, the flow may proceed to step S26 in which the preceding vehicle trajectory curvature radius Rf may be compared with a preset execution determining threshold Ro. One reason for performing this process is that the preceding vehicle center Xf shifts greatly in a horizontal direction in a frame and thus it becomes difficult to calculate the preceding vehicle center Xf with accuracy on the basis of one of the right and the left end points Xr and Xl of the preceding vehicle Mf, when the preceding vehicle trajectory curvature radius Rf is small, i.e., when the preceding vehicle Mf so travels as to turn along a sharp curve. In the present implementation, the execution determining threshold Ro may be set to about 200 meters (Ro=about 200 [m]) without limitation as a limit value used to detect the preceding vehicle center Xf with accuracy.

The routine may be terminated when a determination is made in step S26 that the preceding vehicle trajectory curvature radius Rf is equal to or less than the execution determining threshold Ro (Rf≤Ro). In contrast, the flow may proceed to step S27 when a determination is made in step S26 that the preceding vehicle trajectory curvature radius Rf is greater than the execution determining threshold Ro (Rf>Ro). In step S27 and its subsequent steps S28 to S30, the values of the right and the left end point fluctuation flags Fr and Fl may be checked.

In a case where the left end point fluctuation flag Fl is set and the right end point fluctuation flag Fr is cleared (Fl=1 and Fr=0), i.e., where the left end point Xl is low in reliability and the right end point Xr is high in reliability, the flow may proceed from step S27 to step S31. In step S31, the right end point Xr may be thus employed as a reference to calculate the preceding vehicle center Xf from the following expression (5).

$$Xf = Xr\_now - (W\_max/2) \quad (5)$$

The flow may proceed to step S33 following the calculation of the preceding vehicle center Xf on the basis of the right end point Xr.

In a case where the left end point fluctuation flag Fl is cleared and the right end point fluctuation flag Fr is set (Fl=0 and Fr=1), i.e., where the left end point Xl is high in reliability and the right end point Xr is low in reliability, the flow may proceed from step S28 to step S32. In step S32, the left end point Xl may be thus employed as the reference to calculate the preceding vehicle center Xf from the following expression (6).

$$Xf = Xl\_now - (W\_max/2) \quad (6)$$

The flow may proceed to step S33 following the calculation of the preceding vehicle center Xf on the basis of the left end point Xl. In one implementation, the traveling trajectory processor 16 that performs the processes in steps S31 and S32 may serve as a "vehicle width center calculating unit" or a "first calculator".

In a case where both of the left end point fluctuation flag Fl and the right end point fluctuation flag Fr are set (Fl=1 and Fr=1), i.e., where the left end point Xl and the right end point Xr are both low in reliability, the flow may proceed from step S29 to step S33 without calculating the current preceding vehicle center Xf. In contrast, in a case where both of the left end point fluctuation flag Fl and the right end point fluctuation flag Fr are cleared (Fl=0 and Fr=0), the flow may diverge from step S29 to step S30. In step S30, a check may be performed as to whether the left end point fluctuation flag Fl or the right end point fluctuation flag Fr is cleared by examining step S19 and step S24. In other words, whether the left end point Xl or the right end point Xr is recovered from the fluctuation may be checked in step S30. The flow may proceed to step S33 when a determination is made in step S30 that the left end point fluctuation flag Fl or the right end point fluctuation flag Fr is cleared (Fl=0 from 1 or Fr=0 from 1), i.e., the left end point Xl or the right end point Xr is recovered.

In a case where both of the left end point fluctuation flag Fl and the right end point fluctuation flag Fr are cleared from the beginning (Fl=0 and Fr=0), the routine may be terminated by determining that the left end point Xl and the right end point Xr are both high in reliability. When both of the left end point Xl and the right end point Xr are determined as being high in reliability as a result of the foregoing step S30, the traveling trajectory processor 16 may calculate the preceding vehicle center Xf as usual on the basis of the values of those left and right end points Xl and Xr, i.e., may calculate the preceding vehicle center Xf from the expression: Xf=(Xl+Xr)/2.

Thereafter, the traveling trajectory processor 16 may generate the preceding vehicle traveling trajectory on the basis of the preceding vehicle center Xf calculated in step S31 or S32, or on the basis of the preceding vehicle center Xf calculated as usual on the basis of the expression: Xf=(Xl+Xr)/2. By generating the preceding vehicle traveling trajectory, the traveling trajectory processor 16 may set the thus-generated preceding vehicle traveling trajectory as the target traveling trajectory of the own vehicle Mm. Further, the traveling trajectory processor 16 may so output control signals to various control units, including the steering controller, as to allow the own vehicle Mm to travel along the target traveling trajectory.

When the flow proceeds to step S33 from any of the foregoing steps S29 to S32, a smoothing filter process, or an X filtering, may be performed in order to prevent control hunting. For example, the smoothing filter process may be performed by subjecting the currently-calculated right and left end points Xr and Xl to weighted addition at a predetermined ratio. The values of the currently-calculated right and left end points Xr and Xl having been subjected to the smoothing filter process may be stored into the storage as current calculation values. More specifically, for example, the smoothing filter process may be performed on the basis of the following expression (7):

$$Xmm = (vel\_old) + ((vel - vel\_old)/5) \quad (7)$$

where "vel_old" denotes Xr_old or Xl_old, "vel" denotes Xr or Xl, and "Xmm" denotes Xr or Xl following the smoothing filter process.

According to the present implementation, the traveling trajectory based on the preceding vehicle center Xf, i.e., the preceding vehicle traveling trajectory, is set as the target traveling trajectory of the own vehicle Mm, in a case where the lane lines that define the lane along which the own vehicle Mm travels are unrecognizable from the image captured by the camera unit 3 at the time when the own vehicle Mm so travels as to follow the preceding vehicle Mf. The preceding vehicle center Xf is calculated on the basis of the right and the left end points Xr and Xl that are obtained, from the rear of the preceding vehicle Mf, by the camera unit 3 that may serve as the "outside sensor" in one implementation. When the fluctuation, i.e., the variation in data, is detected for one of the right and the left end points Xr and Xl upon setting the preceding vehicle traveling trajectory, the preceding vehicle center Xf is determined on the basis of the preceding vehicle width maximum value W_max by employing, as the reference, non-fluctuating one of the right and the left end points Xr and Xl. Thus, it is possible to determine a value that is approximate to that of the actual preceding vehicle center Xf as denoted by the white circles in FIG. 8.

As a result, it is possible to detect the center in the vehicle width direction of the preceding vehicle Mf stably and with accuracy even in a case where one of the right and the left end points Xr and Xl of the preceding vehicle Mf is unrecognizable accurately upon the traveling of the own vehicle Mm under any adverse condition that involves low visibility. If the target traveling trajectory of the own vehicle Mm is set on the basis of the erroneous preceding vehicle center Xf denoted by the black circles in FIG. 8, a disturbance may possibly occur in the traveling of the own vehicle Mm due to an improper steering control. In contrast, determining the preceding vehicle center Xf on the basis of properly-detected one of the right and the left end points Xr and Xl as in the present implementation makes it possible to allow the target traveling trajectory to be set along the actual traveling trajectory of the preceding vehicle Mf as denoted by the white circles in FIG. 8, and thereby to achieve stable steering performance.

Incidentally, a comparative example as illustrated in FIG. 3A sets the preceding vehicle traveling trajectory in the following way. First, a distance (i.e., an inter-vehicular distance) and a relative speed between the preceding vehicle Mf and the own vehicle Mm (see FIG. 2) are detected by means of an outside sensor to thereby detect trajectories of the respective right and left end points Xr and Xl that are located in the vehicle width direction as viewed from the rear of the preceding vehicle Mf. After detecting the trajectories of the right and the left end points Xr and Xl, the preceding vehicle center (i.e., the vehicle width center) Xf between the right and the left end points Xr and Xl is determined to set a trajectory of the preceding vehicle center Xf as the preceding vehicle traveling trajectory.

Figure 3C:
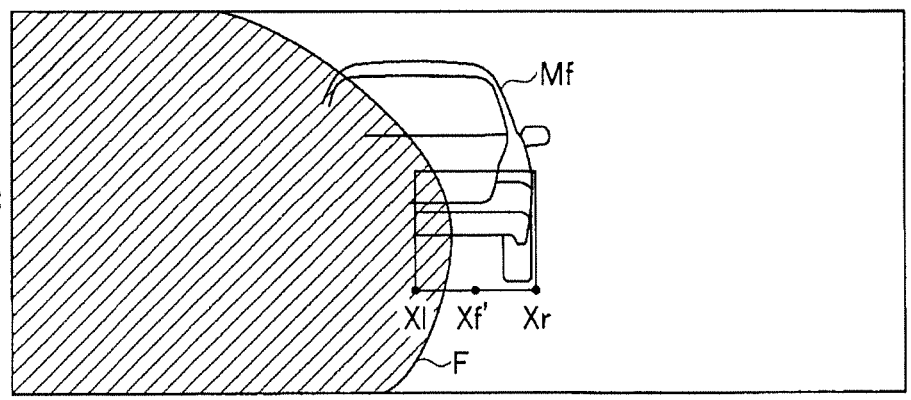
FIG. 3C describes a state in which the left end point is unable to be estimated accurately under the adverse condition according to the comparative example.

The comparative example, however, involves difficulties in detecting the right and the left end points Xr and Xl of the preceding vehicle Mf stably and with accuracy upon setting the preceding vehicle traveling trajectory on the basis of sensing data obtained by the outside sensor, when a traveling environment of the own vehicle Mm is under bad weather or under an adverse condition such as low visibility. More specifically, the comparative example involves the difficulties in that the width between the right and the left end points Xr and Xl is erroneously determined as being narrow in a case where the actual left end point Xl of the preceding vehicle Mf fails to be recognized upon the traveling under the adverse condition as illustrated in FIG. 3C and an erroneous end point is recognized as the left end point Xl. In this case, the preceding vehicle center Xf, set on the basis of the narrowed width, turns out to be set to a position that is deviated from the actual center of the preceding vehicle Mf toward one side, causing a significant reduction in an accuracy of setting the preceding vehicle traveling trajectory.

In the event of the failure in the recognition of the end point, one measure may be to cancel the currently-detected right and left end points Xr and Xl by determining that those right and left end points Xr and Xl are low in reliability. Such a measure, however, decreases an opportunity of providing a driving assist under the adverse conditions and causes inconvenience accordingly.

[Second Implementation]

Figure 9:
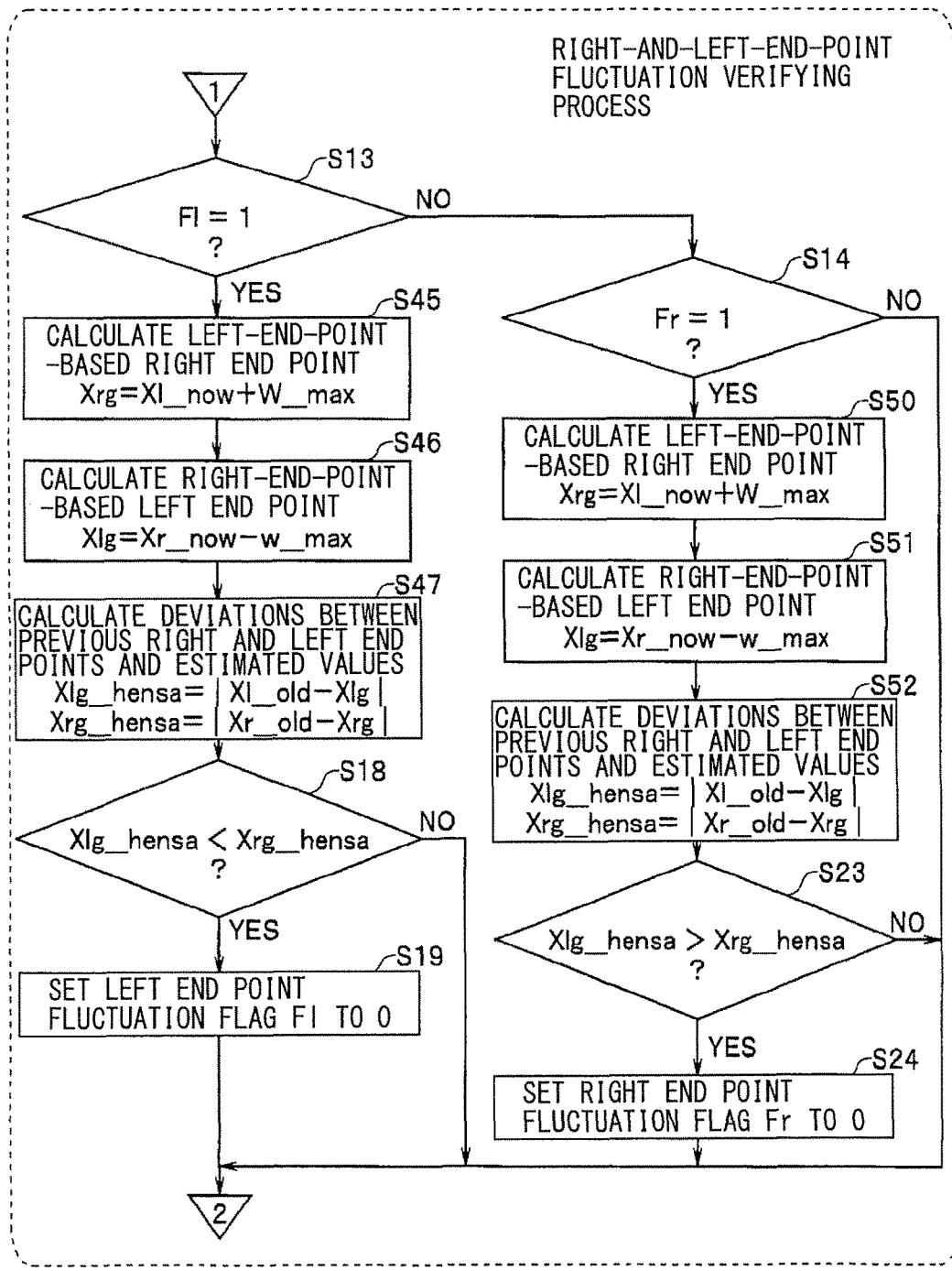
FIG. 9 is a flowchart, equivalent to the flowchart of FIG. 5, of an example routine directed to the calculation of the preceding vehicle center according to a second implementation of the technology.
Figure 10:
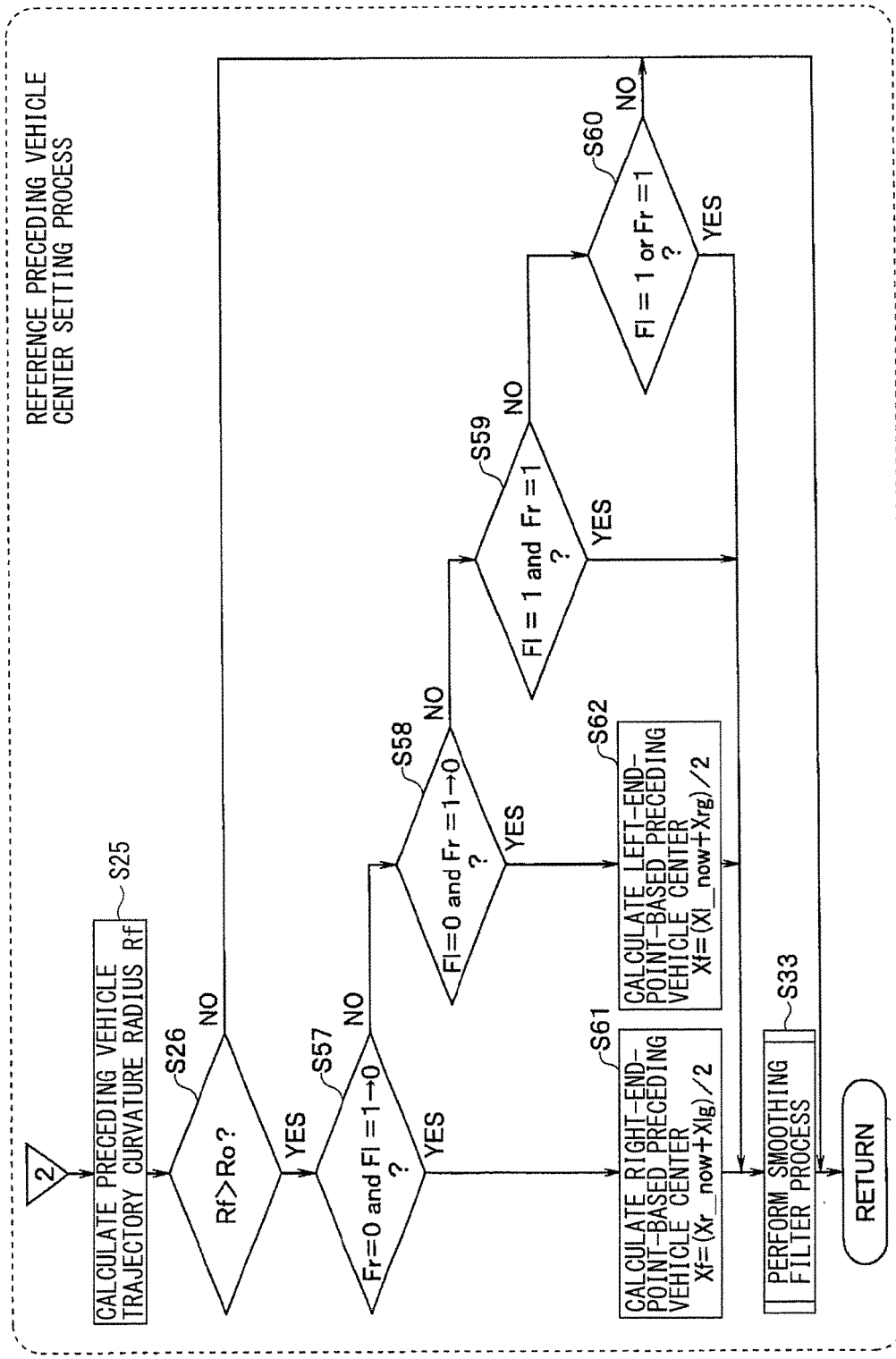
FIG. 10 is a flowchart, equivalent to the flowchart of FIG. 6, of the example routine directed to the calculation of the preceding vehicle center according to the second implementation of the technology.

FIG. 9 and FIG. 10 illustrate a second implementation of the technology, which respectively substitute the flowchart of FIG. 5 and the flowchart of FIG. 6 according to the first implementation. Note that the same or equivalent processes as those of the first implementation are denoted with the same step numbers and will not be described in detail. Further, the preceding vehicle center Xrg and the preceding vehicle center Xlg described with reference to FIG. 5 are respectively read as an estimated value of the right end point Xr and an estimated value of the left end point Xl for description purpose.

In step S45 or S50, the right end point estimated value Xrg may be estimated, on the basis of the left end point Xl_now, from the following expression (1').

$$Xrg = Xl\_now + W\_max \qquad (1')$$

Further, in step S46 or S51, the left end point estimated value Xlg may be estimated, on the basis of the right end point Xr_now, from the following expression (2').

$$Xlg = Xr\_now - W\_max \qquad (2')$$

In one implementation, the traveling trajectory processor 16 that performs the processes in steps S45, S46, S50, and S51 may serve as an "end point estimated value calculator" or a "second calculator".

Thereafter, in step S47 or S52, deviation (i.e., left end point deviation Xlg_hensa) of the left end point estimated value Xlg to the previous left end point Xl_old and deviation (i.e., right end point deviation Xrg_hensa) of the right end point estimated value Xrg to the previous right end point Xr_old may be calculated respectively from the following expressions (3') and (4').

$$Xlg\_hensa = |Xl\_old - Xlg| \qquad (3')$$

$$Xlg\_hensa = |Xr\_old - Xrg| \qquad (4')$$

Thereafter, in step S18 or S23, the left end point deviation Xlg_hensa and the right end point deviation Xrg_hensa may be compared with each other. When the left end point deviation Xlg_hensa is smaller than the right end point deviation Xrg_hensa (i.e., Xlg_hensa<Xrg_hensa), the flow may proceed to step S19 by determining that the left end point estimated value Xlg is high in reliability. In step S19, the left end point fluctuation flag Fl may be cleared (Fl: 0). In contrast, the flow may proceed to step S24 by determining that the right end point estimated value Xrg is high in reliability when the right end point deviation Xrg_hensa is smaller than the left end point deviation Xlg_hensa (i.e., Xrg_hensa<Xlg_hensa). In step S24, the right end point fluctuation flag Fr may be cleared (Fr: 0). In one implementation, the traveling trajectory processor 16 that performs the processes in steps S47, S18, S19, S52, S23, and S24 may serve as an "end point estimated value verifying unit" or a "verifying unit".

Thereafter, in step S57 and its subsequent steps S58 to S60 of FIG. 10, the values of the right and the left end point fluctuation flags Fr and Fl may be checked. In a case where the right end point fluctuation flag Fr is cleared continuously and the left end point fluctuation flag Fl is cleared in step S19 of FIG. 9 (Fr=0 and Fl=0 from 1), the flow may proceed from step S57 to step S61. In step S61, the left end point estimated value Xlg determined in step S46 may be employed to calculate, on the basis of the current right end point Xr_now, the preceding vehicle center Xf from the following expression (5').

$$Xf = (Xr\_now + Xlg)/2 \qquad (5')$$

The flow may proceed to step S33 following the calculation of the preceding vehicle center Xf on the basis of the expression (5').

In a case where the left end point fluctuation flag Fl is cleared continuously and the right end point fluctuation flag Fr is cleared in step S24 of FIG. 9 (Fl=0 and Fr=0 from 1), the flow may proceed from step S58 to step S62. In step S62, the right end point estimated value Xrg determined in step S50 may be employed to calculate, on the basis of the current left end point Xl_now, the preceding vehicle center Xf from the following expression (6').

$$Xf = (Xl\_now + Xrg)/2 \qquad (6')$$

The flow may proceed to step S33 following the calculation of the preceding vehicle center Xf on the basis of the expression (6'). In a case where both of the left end point fluctuation flag Fl and the right end point fluctuation flag Fr are set (Fl=1 and Fr=1), the flow may proceed from step S59 straight to step S33. In one implementation, the traveling trajectory processor 16 that performs the processes in steps S61 and S62 may serve as the "vehicle width center calculator" or the "first calculator".

In a case where one of the left end point fluctuation flag Fl and the right end point fluctuation flag Fr is set continuously, the flow may proceed straight to step S33. In contrast, the routine may be terminated in a case where both of the left end point fluctuation flag Fl and the right end point fluctuation flag Fr are cleared.

According to the second implementation, the right end point deviation Xrg_hensa and the left end point deviation Xlg_hensa are compared with each other. Further, when one of the right end point estimated value Xrg and the left end point estimated value Xlg which is high in reliability is detected, the preceding vehicle center is calculated on the basis of detected one of the right and the left end point estimated values Xrg and Xlg and one of the right and the left end points Xr_now and Xl_now. Hence, it is possible for the second implementation to achieve effects similar to those of the first implementation.

Although some preferred implementations of the technology have been described in the foregoing by way of example with reference to the accompanying drawings, the technology is by no means limited to the implementations described above. For example, the outside sensor is not limited to the camera unit 3. Any unit including any sensing device or any combination of sensing devices may be employed as long as the sensing device or the combination is able to detect the preceding vehicle Mf. Non-limiting examples of the sensing device may include ultrasonic radar, LiDAR, and millimeter-wave radar. Any of such devices may also be combined with a monocular camera.

The traveling trajectory processor 16 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable tangible medium, to perform all or a part of functions of the traveling trajectory processor 16. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the traveling trajectory processor 16 illustrated in FIG. 1.

It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle driving assist apparatus mounted on an own vehicle, the vehicle driving assist apparatus comprising:
    an outside sensor mounted on the own vehicle, the outside sensor capturing images of environment outside the own vehicle, the images being captured one after another in chronological order, the images including a preceding vehicle that the own vehicle follows, the own vehicle following the preceding vehicle according to a travel trajectory generated based on a vehicle width center of the preceding vehicle;
    a processor; and
    at least one machine readable tangible medium storing instructions, which when executed by the processor, causes the processor to perform operations comprising:
        detecting, based on a current image of the captured images, a current first end position and a current second end position of the preceding vehicle in a vehicle width direction of the preceding vehicle;
        comparing the current first end position to a reference first end position of the preceding vehicle, the reference first end position being a first end position of the preceding vehicle identified from a first previous image of the captured images, the first previous image captured prior to the current image;
        comparing the current second end position to a reference second end position of the preceding vehicle, the reference second end position is a second end position of the preceding vehicle identified from the first previous image of the captured images;
        determining whether an amount of change between the current first end position and the reference first end position exceeds a threshold value;
        when the amount of change between the current first end position and the reference first end position of the preceding vehicle exceeds the threshold value, determining a current vehicle width center of the preceding vehicle based on the current second end position of the preceding vehicle;
        updating, automatically by the vehicle driving assist apparatus, the traveling trajectory based on the determined current vehicle width center of the preceding vehicle; and
        transmitting the updated traveling trajectory to control units of the own vehicle to allow the own vehicle to follow the preceding vehicle along the traveling trajectory.

2. The vehicle driving assist apparatus according to claim 1, wherein comparing the current second end position to a reference second end position of the preceding vehicle includes determining whether an amount of change between the current second end position and the reference second end position exceeds the threshold value, and
    when the amount of change between the current first end position and the reference first end position exceeds the threshold value and the amount of change between the current second end position and the reference second end position is equal to or less than the threshold value, a current vehicle width center of the preceding vehicle is determined based on the current second end position of the preceding vehicle.

3. The vehicle driving assist apparatus according to claim 2, wherein the operations further comprise determining a maximum width of the preceding vehicle based on previous images captured prior to the current image,
    wherein the maximum width of the preceding vehicle is a maximum distance between a first end position and a second end position of the preceding vehicle from a second previous image of the images, the second previous image captured prior to the current image, and
    wherein the current vehicle width center is determined further based on the maximum width of the preceding vehicle.

4. The vehicle driving assist apparatus according to claim 3, wherein the operations are repeated for subsequent images captured after the current image, and
    when the first end position does not match the first reference end position consecutively in a number of subsequent images, data associated with the preceding vehicle is reset.

5. The vehicle driving assist apparatus according to claim 2,
    wherein the operations further comprises:
        determining a maximum width of the preceding vehicle based on previous images captured prior to the current image, the maximum width of the preceding vehicle being a maximum distance between a first end position and a second end position of the preceding vehicle from a second previous image of the images, the second previous image captured prior to the current image; and estimating an actual end position of the current first end position based on the maximum width of the preceding vehicle, and wherein the current vehicle width center of the preceding vehicle is determined based further on the estimated actual end position.

6. The vehicle driving assist apparatus according to claim 5, wherein the operations further comprises:

determining a first pseudo current vehicle width center based on the current first end position and the maximum width of the preceding vehicle;

determining a second pseudo current vehicle width center based on the current second end position and the maximum width of the preceding vehicle;

determining a reference vehicle width center based on the reference first end position and the reference second end position detected from the first previous image;

determining a first difference based on comparing the first pseudo current vehicle width center to the reference vehicle width center; and determining a second difference based on comparing the second pseudo current vehicle width center to the reference vehicle width center, wherein a reliability degree of the actual end position is determined to be high when the first difference is larger than the second difference, and wherein the current vehicle width center is determined further based on the actual end position when the reliability degree of the actual end is determined to be high.

7. The vehicle driving assist apparatus according to claim 2, wherein the operations are repeated for subsequent images captured after the current image, and when the first end position does not match the first reference end position consecutively in a number of subsequent images, data associated with the preceding vehicle is reset.

8. The vehicle driving assist apparatus according to claim 1, wherein the operations further comprise determining a maximum width of the preceding vehicle based on previous images captured prior to the current image, wherein the maximum width of the preceding vehicle is a maximum distance between a first end position and a second send position of the preceding vehicle from a second previous image of the images, the second previous image captured prior to the current image, and wherein the current vehicle width center is determined further based on the maximum width of the preceding vehicle.

9. The vehicle driving assist apparatus according to claim 8, wherein the operations are repeated for subsequent images captured after the current image, and when the first end position does not match the first reference end position consecutively in a number of subsequent images, data associated with the preceding vehicle is reset.

10. The vehicle driving assist apparatus according to claim 1, wherein the operations further comprises:

determining a maximum width of the preceding vehicle based on previous images captured prior to the current image, the maximum width of the preceding vehicle being a maximum distance between a first end position and a second end position of the preceding vehicle from a second previous image of the images, the second previous image captured prior to the current image; and estimating an actual end position of the current first end position based on the maximum width of the preceding vehicle, and wherein the current vehicle width center of the preceding vehicle is determined further based on the estimated actual end position.

11. The vehicle driving assist apparatus according to claim 10, wherein the operations further comprises:

determining a first pseudo current vehicle width center based on the current first end position and the maximum width of the preceding vehicle;

determining a second pseudo current vehicle width center based on the current second end position and the maximum width of the preceding vehicle;

determining a reference vehicle width center based on the reference first end position and the reference second end position detected from the first previous image;

determining a first difference based on comparing the first pseudo current vehicle width center to the reference vehicle width center; and determining a second difference based on comparing the second pseudo current vehicle width center to the reference vehicle width center, wherein a reliability degree of the actual end position is determined to be high when the first difference is larger than the second difference, and wherein the current vehicle width center is determined further based on the actual end position when the reliability degree of the actual end is determined to be high.

12. The vehicle driving assist apparatus according to claim 1, wherein the operations are repeated for subsequent images captured after the current image, and when the first end position does not match the first reference end position consecutively in a number of subsequent images, data associated with the preceding vehicle is reset.

13. A vehicle driving assist apparatus mounted on an own vehicle, the vehicle driving assist apparatus comprising:

circuitry configured to:

detect, based on a current image of images captured by an outside sensor mounted on the own vehicle, a current first end position and a current second end position of a preceding vehicle in a vehicle width direction of the preceding vehicle, the images being captured one after another in chronological order, the images including a preceding vehicle that the own vehicle follows, the own vehicle following the preceding vehicle according to a travel trajectory generated based on a vehicle width center of the preceding vehicle;

compare the current first end position to a reference first end position of the preceding vehicle, the reference first end position being a first end position of the preceding vehicle identified from a first previous image of the captured images, the first previous image captured prior to the current image;

compare the current second end position to a reference second end position of the preceding vehicle, the reference second end position is a second end position of the preceding vehicle identified from the first previous image of the captured images;

determine whether an amount of change between the current first end position and the reference first end position exceeds a threshold value;

when the amount of change between the current first end position and the reference first end position of the preceding vehicle exceeds the threshold value, determine a current vehicle width center of the preceding vehicle based on the current second end position of the preceding vehicle;

update, automatically by the vehicle driving assist apparatus, the traveling trajectory based on the determined current vehicle width center of the preceding vehicle; and transmit the updated traveling trajectory to control units of the own vehicle to allow the own vehicle to follow the preceding vehicle along the traveling trajectory.

\* \* \* \* \*